(12) United States Patent
Knittel

(10) Patent No.: US 6,542,154 B1
(45) Date of Patent: Apr. 1, 2003

(54) ARCHITECTURAL EXTENSIONS TO 3D TEXTURING UNITS FOR ACCELERATED VOLUME RENDERING

(75) Inventor: Guenter Knittel, Mountain View, CA (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/370,612

(22) Filed: Aug. 7, 1999

(51) Int. Cl.[7] .............................................. G06T 15/20
(52) U.S. Cl. ...................... 345/427; 345/424; 345/582
(58) Field of Search ................................. 345/424, 582, 345/554, 539, 427; 365/230.05

(56) References Cited

U.S. PATENT DOCUMENTS 6,232,979 B1 * 5/2001 Shochet ...................... 345/430
6,262,740 B1 * 7/2001 Lauer et al. ................ 345/424
6,307,565 B1 * 10/2001 Quirk et al. ................ 345/554

* cited by examiner

Primary Examiner—Mark Zimmerman
Assistant Examiner—Lance W. Sealey

(57) ABSTRACT

Volume rendering of an image from a volume data set is performed by dividing the image into a plurality of sub-regions and processing the sub-regions one at a time. The sub-regions are processed one at a time by a chip including a triangle unit for creating projections of sub-region on at least one plane cutting the volume data set; a rasterization/3D-texturing unit for texturing each projection received from the triangle unit; and a triangle buffer and compositing unit for compositing each projection textured by the rasterization/texturing unit. After a sub-region has been processed, the chip sends the composited projection to an external frame buffer for display.

28 Claims, 10 Drawing Sheets

Fig. 3
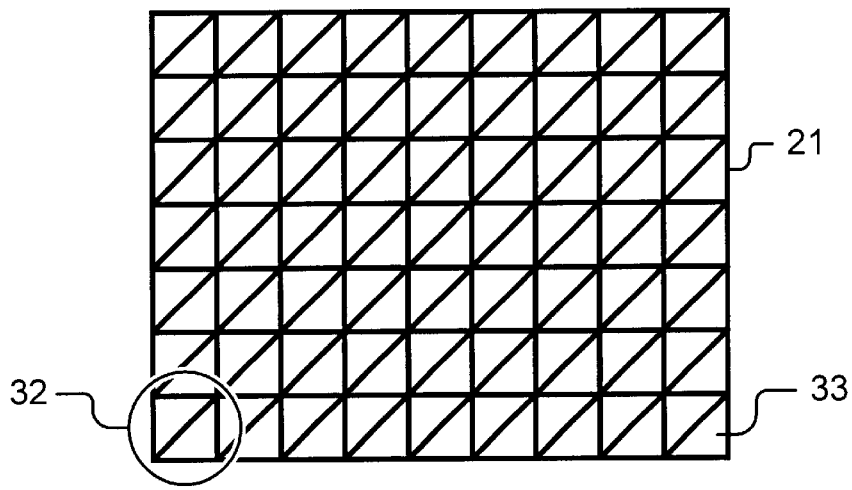
Pixel 22 (Raypoint) written back into Triangle Buffer 71
Pixel 22 (Raypoint) clocked into input Register 70
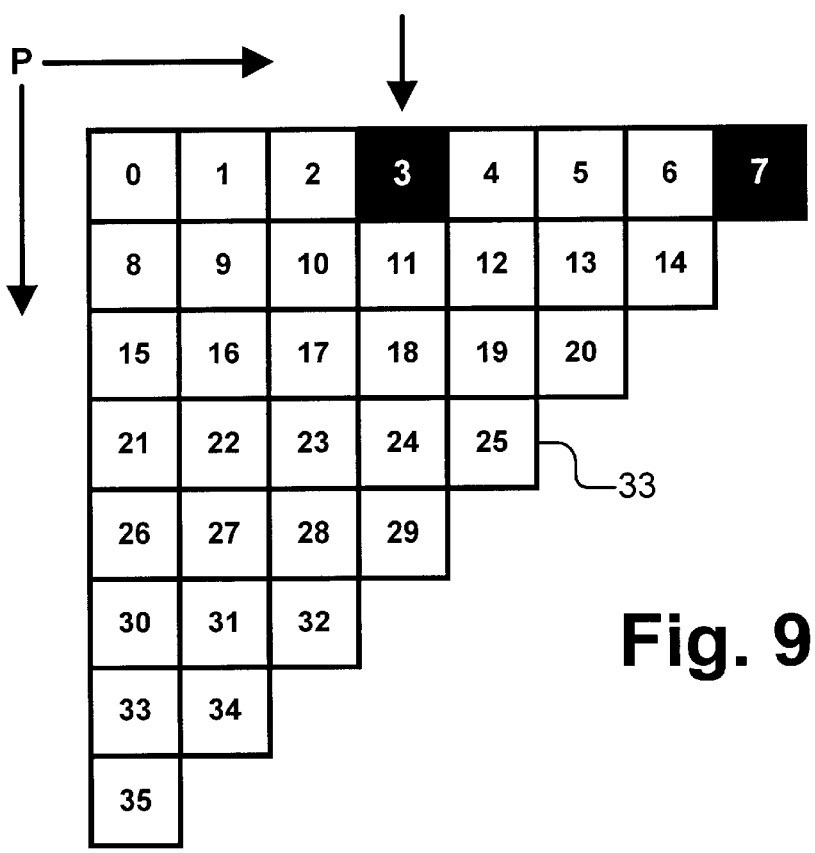
Fig. 9

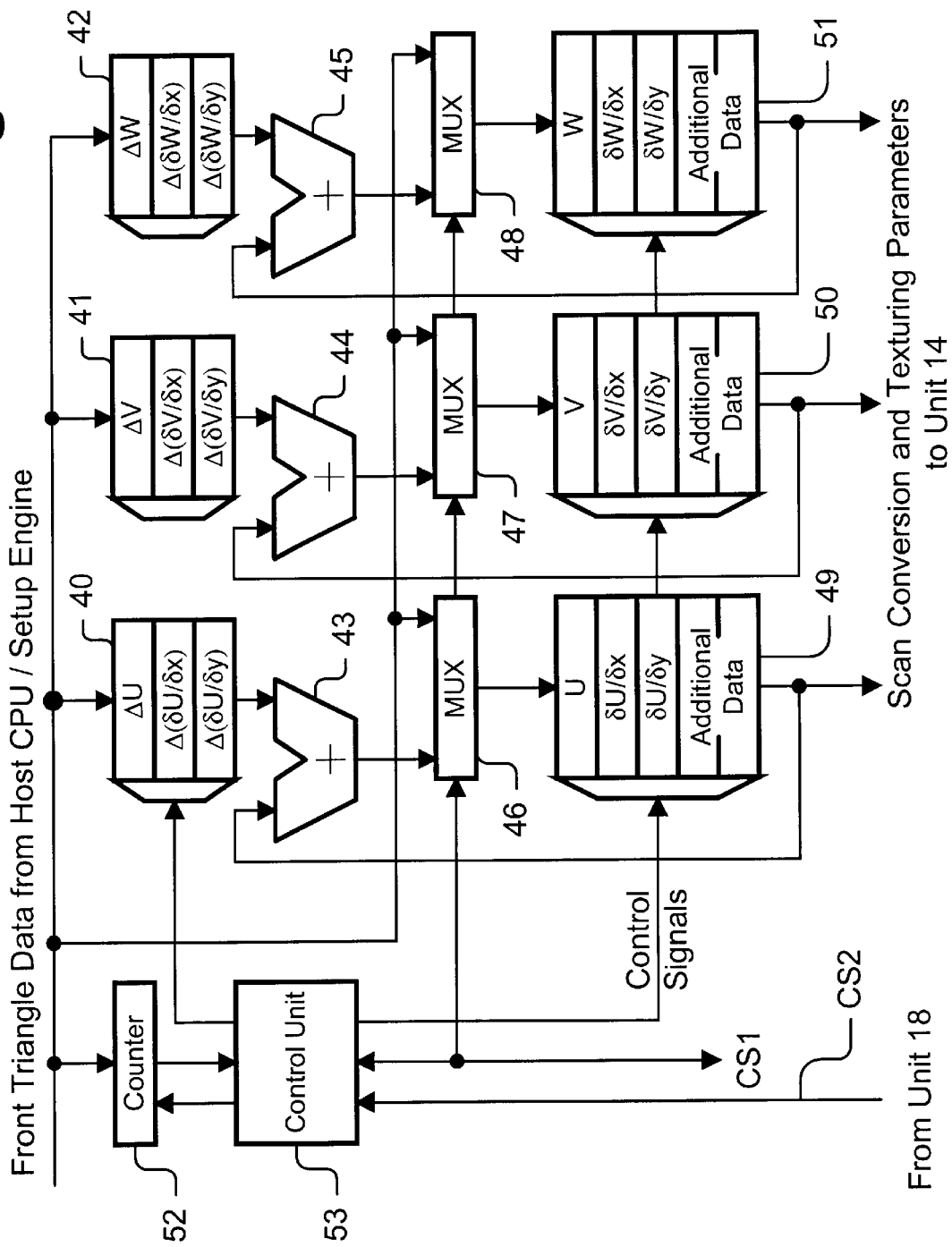

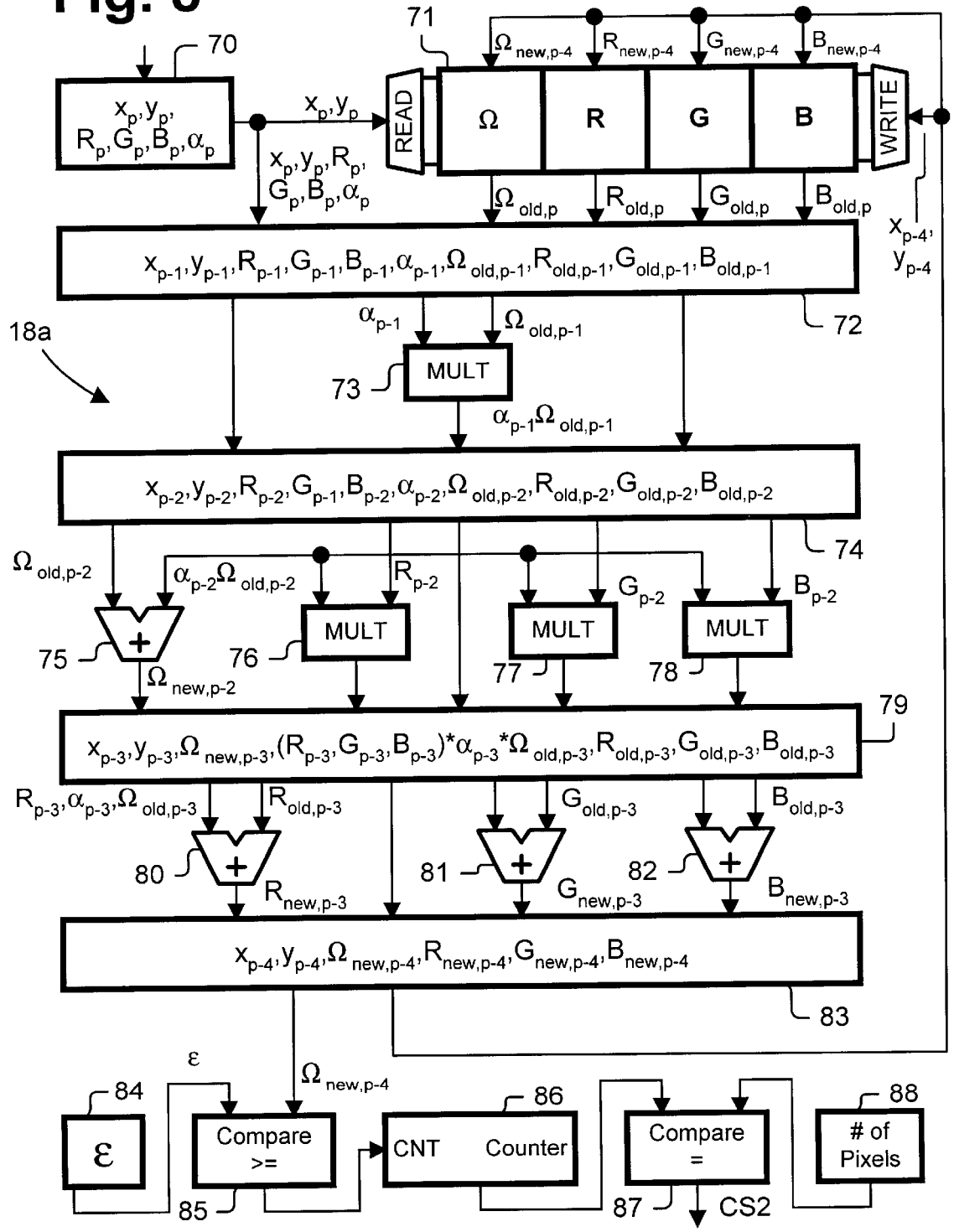

Fig. 11
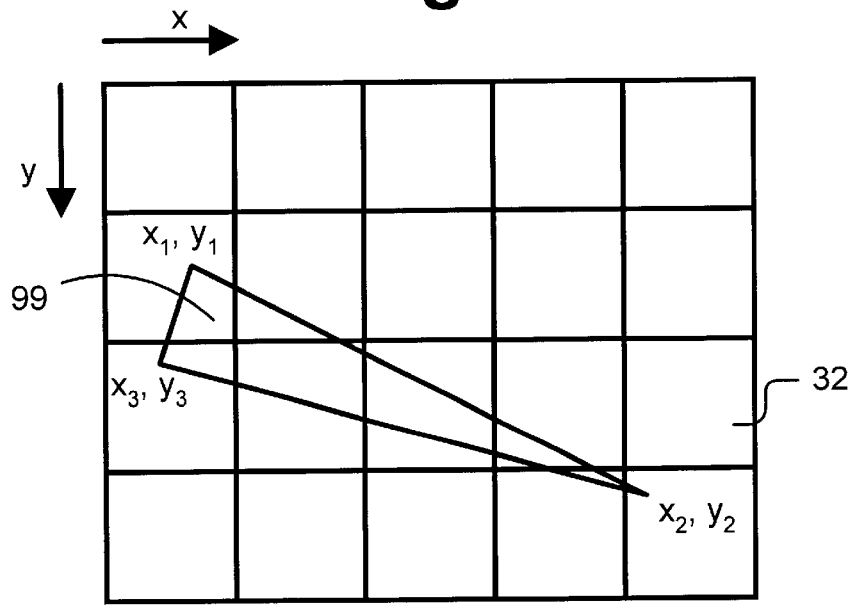
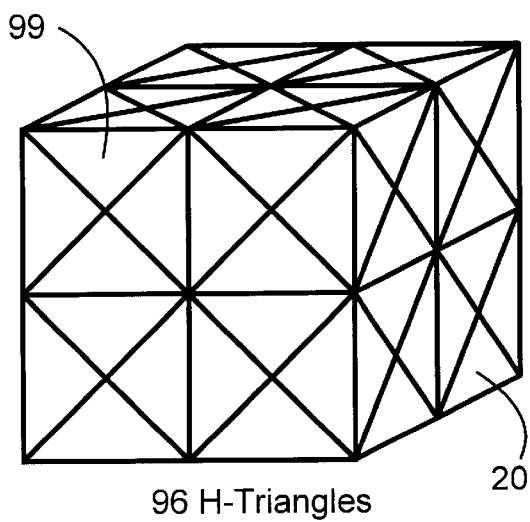
96 H-Triangles
Fig. 12a
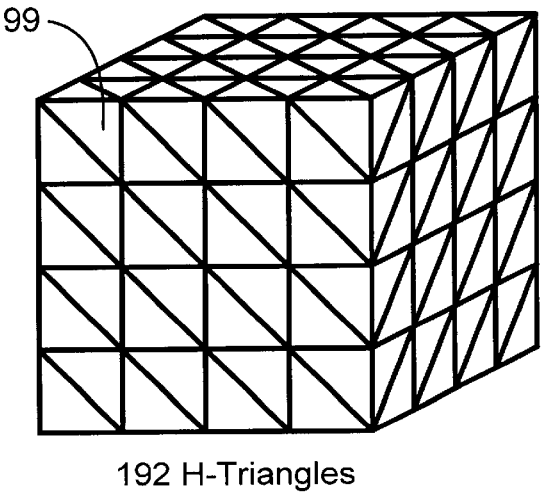
192 H-Triangles
Fig. 12b

ARCHITECTURAL EXTENSIONS TO 3D TEXTURING UNITS FOR ACCELERATED VOLUME RENDERING

BACKGROUND OF THE INVENTION

The present invention relates to computer graphics. More specifically, the present invention relates to volume rendering using 3-D texturing units.

Surface-oriented graphics and volume graphics are two important fields within computer graphics. They differ in the way objects are represented in the computer and the way they are displayed.

A. Surface-Oriented Graphics

In surface-oriented graphics, only the surface of a given object is stored inside the computer. For practicability, a curved surface may be approximated by a potentially large number of triangles or other polygons. The triangles in turn are defined by the properties of their vertices. Thus, objects are defined by a structured list of vertices, wherein each of the vertices in turn is defined by a multitude of data items, comprising at least the geometrical coordinates. The objects, such as the body of a car and its tires, are usually defined in their own coordinate system.

A database containing all the objects is usually stored in main memory and maintained by a host CPU.

For the display, the objects are transformed into screen space according to the desired arrangement in the scene. These geometric transformations, which usually include a perspective transformation, finally give the projection of each triangle on the display area of a computer graphics output device. These transformations are usually performed by the host CPU or a specialized geometry processor.

Typically, computer graphics output devices are raster devices, i.e., the display area (or screen) comprises a set of discrete picture elements, or pixels for short. Each triangle's projection on the screen is therefore decomposed into the set of pixels it covers, a process called scan-conversion or rasterization. Commonly, square pixels are assumed.

For each pixel inside a projected triangle, the local color of the surface is computed by applying illumination models. This process is called shading. As an example, the color of the vertices are computed prior to rasterization in accordance to location and physical behavior of the light sources in the scene. To determine an individual pixel color, the values at the vertices are then interpolated at the pixel location.

For greater realism a technique called texture mapping is widely used. In the two-dimensional case, a texture is any form of discrete image, consisting of a two-dimensional array of texture elements or texels for short. As an example, a texture can be a scanned photograph, wherein a texel consists of one numerical value for each color component (RGB). Additionally, a texture can be translucent. In this case, a texel has a fourth parameter to define the local opacity, commonly denoted by "$\alpha$".

During the design of an object (called the modeling stage), a texture is mapped on its surface by assigning texture coordinates to the vertices of the triangles.

After projecting a triangle on the screen for display, texture mapping raises the problem of determining which portions of the texture are covered by the individual pixels, and which color is assigned to a pixel accordingly. To determine the location of the pixel projection on the texture, the texture coordinates given at the vertices are interpolated at the pixel center. However, using the RGB-triple or RGB$\alpha$-quadruple at or nearest to these coordinates would result in strong resampling artifacts (i.e., aliasing).

For example, in a hypothetical image consisting of a sphere and a globe (i.e., oceans, continents, ice caps etc.), the globe might cover the entire screen or just a few pixels, depending on the distance from the observer. Thus, a filter operation is performed for each pixel according to the size and shape of its projection on the texture.

For hardware systems, this is most often done using bi- or tri-linear interpolation within a "Mipmap." A Mipmap is a collection of pre-filtered textures, each of them being denoted a level. Level 0 holds the original texture. 2×2 texels in level 0 are averaged, and the resulting value is one texel in level 1. This is continued towards the top level, which in case of square textures holds exactly one entry, the mean color of the entire texture.

For bi-linear interpolation, a level is chosen with texels best matching the size of the pixel projection. The pixel color is bi-linearly interpolated from the four texels surrounding the projection of the pixel center.

For tri-linear interpolation, two adjacent levels are chosen: one level holding the texels being smaller than the pixel projection, and the other holding larger texels. In each level, a bi-linear interpolation is performed. Finally, the two results are linearly interpolated according to the size of the pixel projection.

A typical embodiment of this method would therefore incorporate a memory system holding the Mipmap and a processor for interpolating texture coordinates across the screen triangle, accessing the texture memory and performing the interpolations.

Rasterization and the texturing are typically carried out by a combined rasterizer/texturing unit, connected to a local memory system which stores the textures.

Interpolation of the different quantities (i.e., color components RGB, texture coordinates) across a screen triangle is done by computing these values at a given vertex, hereinafter called the "starting vertex," computing the derivatives of these quantities with respect to the screen coordinates and adding the derivatives, stepping from one pixel to the next or from one line to he next.

Computing the derivatives is part of the setup stage and usually carried out by the host CPU or a dedicated setup processor.

Recently extensions to three-dimensional textures have been introduced. A 3D-texture is simply a three-dimensional array of texels. A Mipmap in this case is a collection of pre-filtered 3D-textures. An entry in level n+1 is computed from 2×2×2 entries in level n. For each pixel, three texture coordinates are interpolated. In the case of filtering in only one Mipmap level, a tri-linear interpolation is performed. Using two levels, two tri-linear interpolations are followed by a final linear interpolation as explained above.

3D-texture mapping has advantages whenever a 2D-texture cannot be mapped consistently on a 3D-surface, as is the case for complex-shaped wooden objects. Hardware accelerators for 3D-texture mapping are available today.

B. Volume Graphics

Volume graphics, as opposed to surface-oriented graphics, is used whenever the interior of objects is important or when there is no clearly defined surface. Typical applications include medical diagnosis, non-destructive material testing and geology.

For processing within a computer, the properties of interest (e.g., the density or the temperature) of the objects are sampled on a three-dimensional grid to give a discrete scalar field, the so-called "volume data set." The elements of a volume data set are called voxels. Usually the grid is rectangular and isotropic in at least two dimensions. Typical dimensions are $128^3$ up to $1024^3$.

The visualization of these data sets consists of two parts: the segmentation, or classification, during which it is determined which subset of the data set should be visible (e.g., only the bones in a medical data set), and the meaningful display of these structures on the output device.

It may be assumed that the result of the classification is a parameter per voxel defining its visibility or opacity, hereinafter called "$\alpha$". Usually a runs from 0 to 1, where $\alpha=0$ means that the voxel is completely transparent, and $\alpha=1$ defines a completely opaque voxel.

Furthermore it is assumed that a shading operation is performed per voxel. Each voxel is assumed to be part of a surface element, oriented according to the local gradient, and thus, illumination models from surface-oriented graphics can be applied. After classification and shading, the voxels of the data set are defined by RGB$\alpha$-quadruples.

For the display, or rendering, a number of methods have been developed. The most popular algorithm is raycasting. For raycasting, a camera model is constructed by defining a center of projection (the eye point) and a virtual screen, consisting of a number of pixels.

Starting from the eye point, a viewing ray is shot through the volume for each pixel on the virtual screen. Each ray is a sequence of equidistant, discrete points in-between the entry and exit points of the volume. Since the raypoints generally do not coincide with the grid points, the data set is resampled at the raypoints using a set of surrounding voxels. Most often, a tri-linear interpolation using the eight surrounding voxels is used. In the case of RGB$\alpha$-data sets, the four components are interpolated separately.

The color components of a raypoint are weighted by its translucency. Finally, the weighted colors of all raypoints are blended component-wise either in front-to-back or back-to-front order to give the final pixel color. This process is called compositing, which involves the application of a usually simplified absorption model according to the translucency of the individual raypoints.

C. Hardware for Volume Rendering

As of today, the number of commercially available hardware accelerators for volume rendering is much smaller than that of surface-oriented graphics accelerators.

However, RGB$\alpha$-volume data sets are practically identical to commonly used 3D-textures (provided they also have an opacity component). Moreover, the processing of a pixel to be textured using a 3D-texture is very similar to the processing of a raypoint. Therefore, 3D-texturing units are increasingly being used for volume rendering. For this purpose, however, the volume rendering algorithm is rearranged.

First, it is assumed that all raypoints lie on a set of equidistant planes parallel to the view plane (virtual screen). The distance of one plane to another is given by the distance of the raypoints on the ray closest to the center of the virtual screen. For perspective projections this means that the raypoint distance increases towards the edges of the virtual screen.

Instead of processing the volume data set ray by ray, processing is performed plane by plane. The plane to be processed is cut with the volume data set and the area inside the data set is decomposed into triangles. Each triangle is then rasterized to produces pixels having centers that coincide with raypoints. Each pixel is textured using the volume data set as 3D-texture.

The compositing is done with the help of a frame buffer, which is part of most graphics systems. As soon as a plane pixel is textured, the entry in the frame buffer corresponding to the associated ray is read out, and the retrieved value is blended with the newly generated one. The result is written back into the frame buffer at the same location.

Prior to rendering a given scene, the frame buffer is initialized properly to achieve correct results.

The method is functionally equivalent to raycasting, and can readily be used with 3D-texturing units if the blending (compositing) operation is supported by the 3D-texturing system. In terms of performance it is advantageous if the data set fits entirely into the texture memory. Otherwise the data set is split into sub-volumes, which are rendered sequentially.

A significant drawback of existing systems is the limited achievable performance. For each raypoint one read and one write operation is performed with the frame buffer for the compositing operation. Assuming that the number of raypoints is approximately equal to the number of voxels, and each read or write cycle takes 50 ns (optimistically), the rendering of a volume data set of $256^3$ voxels would take 1.68 s no matter how fast all other components are processed.

Another drawback of existing systems is that they usually cannot take advantage of large opaque structures in the data set for early ray termination, and large empty regions in the data set for empty space skipping. For most data sets, early ray termination and empty space skipping provide a substantial speed-up. Early ray termination means that the processing of a ray is terminated prior to volume exit whenever it has traversed so much (partially) opaque material that all further raypoints are hidden. Early ray termination is employed when front-to-back compositing is used. Empty space in volume data sets mostly occurs between the physical boundaries of the object (e.g., a human head) and the rectangular bounding volume of the data set.

In conclusion, it is desirable to use hardware such as 3D-textuing units for volume rendering. The 3D-texturing units are commercially available and easy to implement.

However, it would be desirable to modify the 3D-texturing units to increase rendering speed. For example, it would desirable to reduce the number of read and write operations on data in the external frame buffer. This is a serious source of inefficiency in traditional systems. Reducing the number of operations on the external frame buffer would increase rendering speed.

It would also be desirable to modify the 3D-texturing units to take advantage of early ray termination and empty space skipping. Less time would be spent on processing raypoints that do not contribute to the rendered image. Thus, taking advantage of early ray termination and empty space skipping would further reduce processing time and further increase rendering speed.

Finally, it would be desirable to increase the rendering speed while making as few modifications as possible to the 3-D texturing units.

SUMMARY OF THE INVENTION

Rendering speed is increased by the present invention. According to one aspect of the invention, an image from a volume data set is generated by dividing the image into a plurality of sub-regions, each sub-region including a plurality of pixels; and processing each sub-region one at a time. Each sub-region is processed by creating a projection of the sub-region on at least one plane cutting the volume data set, texture mapping at least one projection of the sub-region using the volume data set as texture, starting at a first plane and working towards a last plane, and compositing each textured projection after texture mapping. The composited projections are displayed.

BRIEF DESCRIPTION OF THE DRAWINGS

FIG. 3 is an illustration of a decomposition of a virtual screen into tiles and S-triangles;

FIG. 7 is an illustration of a triangle unit for the system shown in FIG. 2;

FIG. 8 is an illustration of a triangle buffer and compositing unit for the system shown in FIG. 2;

FIG. 9 is an illustration of a possible processing order of the pixels of a given P-triangle;

FIG. 11 is an illustration of how H-triangles of a bounding hull are scan-converted on a virtual screen in tile resolution; and FIGS. 12a and 12b illustrate two possible triangulations of a bounding hull that has the same boundaries as a volume data set.

DETAILED DESCRIPTION OF THE INVENTION

Figure 1:
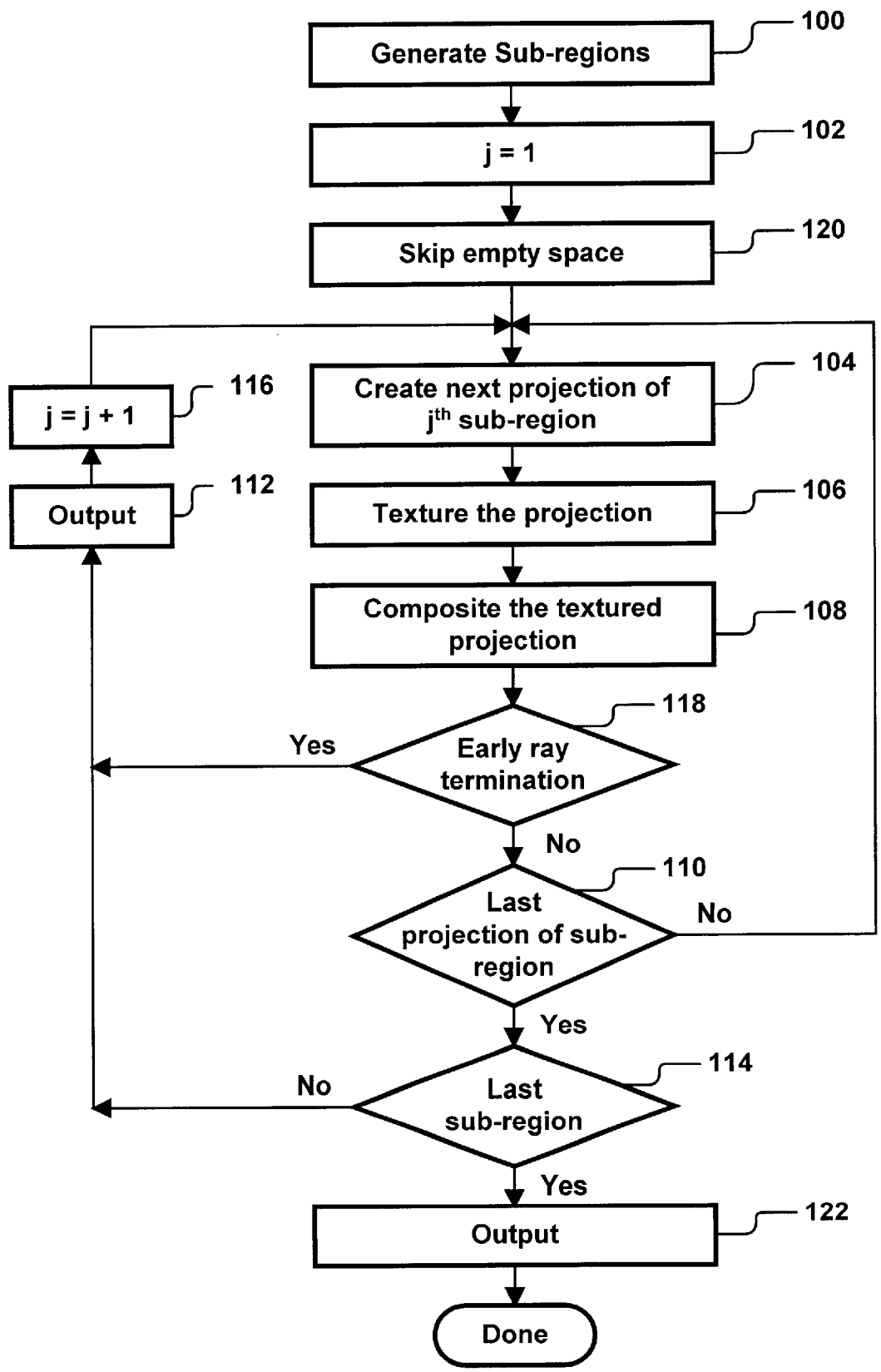
FIG. 1 is an illustration of a method of performing volume rendering in accordance with the present invention.

As shown in the drawings for purposes of illustration, the invention is embodied in a computer that performs volume rendering. The computer performs the volume rendering in a manner that reduces the number of I/O operations to off-chip memory. Reducing the number of I/O operations increases the rendering speed. Additionally, the computer can skip processing of invisible raypoints and empty space. Because the computer does not waste time processing invisible raypoints and empty space, rendering speed is further increased.

FIG. 1 shows a general method of performing the volume rendering. An image to be generated from a volume data set is divided into a plurality of sub-regions, each sub-region including a plurality of pixels (block 100). Starting with a first sub-region (block 102), each sub-region is processed one at a time (blocks 104 to 120). Each sub-region is processed by creating a projection of the sub-region on at least one plane cutting the volume data set (block 104), texture mapping the projection of the sub-region using the volume data set as texture (block 106), and compositing each textured projection after texture mapping (block 108). If the projection is not a back projection (block 110), another projection of the sub-region is processed (block 104). After a sub-region has been processed, the composited projections are outputted for display (block 112). Subsequent sub-regions are processed until all of the sub-regions have been processed (blocks 114 and 116). After the last sub-region has been processed, the composited projections of the last sub-region are outputted for display (block 124).

Early ray termination may be performed (block 118). Processing of a sub-region is terminated at a given projection if all subsequent projections on planes after the given projection are not visible. Visibility may be determined by examining composite transparency of the projections previous to the given projection.

Skipping of empty space may also be performed (block 120). During pre-processing, that is, before the volume data set is divided into a plurality of sub-regions, a bounding hull is generated around non-empty space of the volume data set and projected, and front and back planes are determined. Only those projections that are at least partially within the bounding hull are processed.

Figure 2:
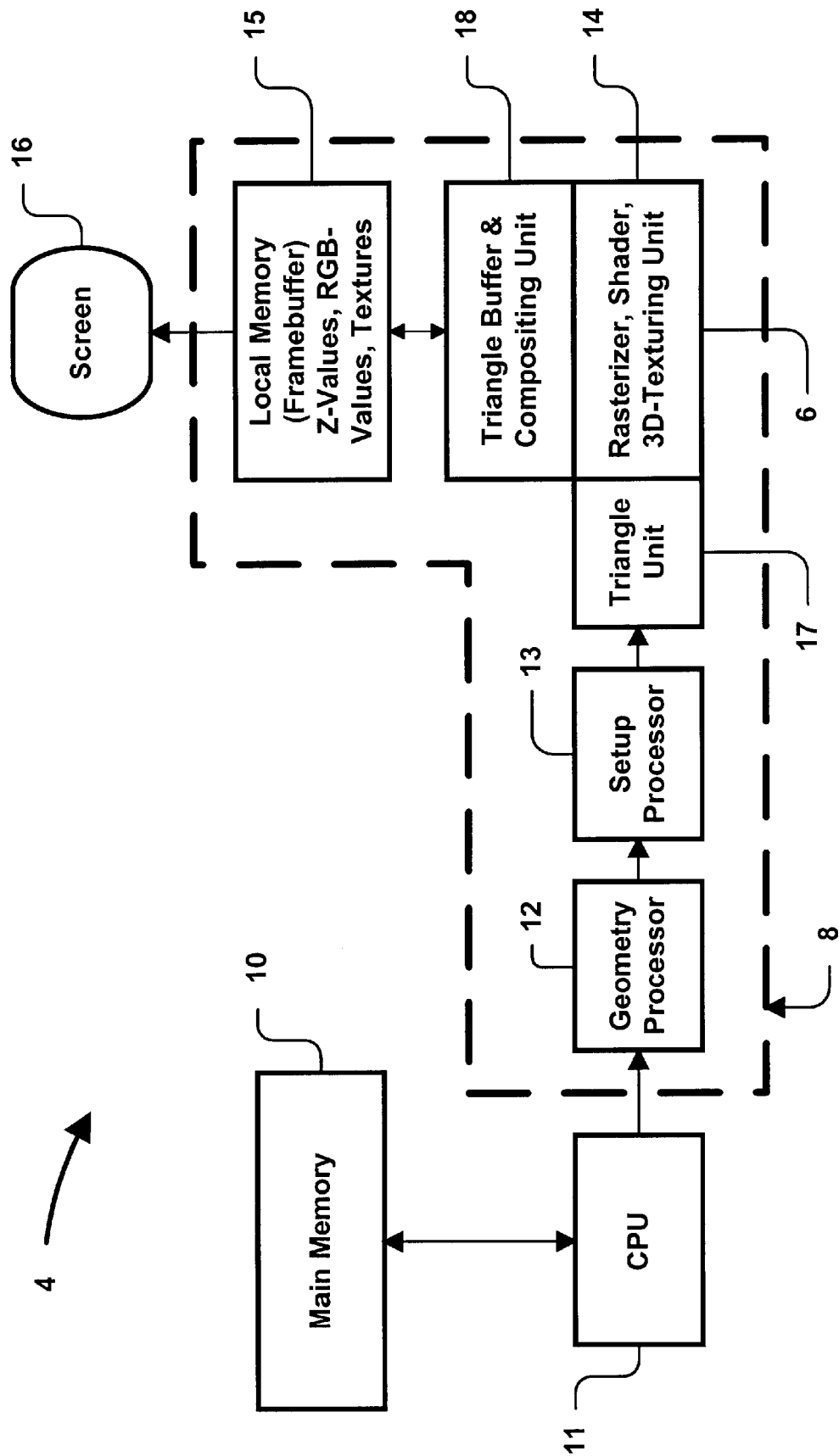
FIG. 2 is an illustration of a system for performing volume rendering in accordance with the present invention.

FIG. 2 shows hardware 4 for implementing the method just described. The hardware 4 includes a main memory 10, a central processing unit ("CPU") 11, a geometry processor 12, a setup processor 13, a triangle unit 17, a rasterizer/shader/3D texturing unit 14, a triangle buffer and compositing unit 18, and an external frame buffer 15. The external frame buffer 15 holds the rendered image that is displayed on a screen 16.

The main memory 10 and the CPU 11 are typically part of a host computer. The triangle unit 17, the rasterizer/shader/3D texturing unit 14, and the triangle buffer and compositing unit 18 may be fabricated on a single chip 6. The geometry processor 12, the setup processor 13 and the external frame buffer 15 may be fabricated on separate chips. The chips 6, 12, 13 and 15 comprise a graphics accelerator 8, which is mounted inside the host computer.

Figure 4A:
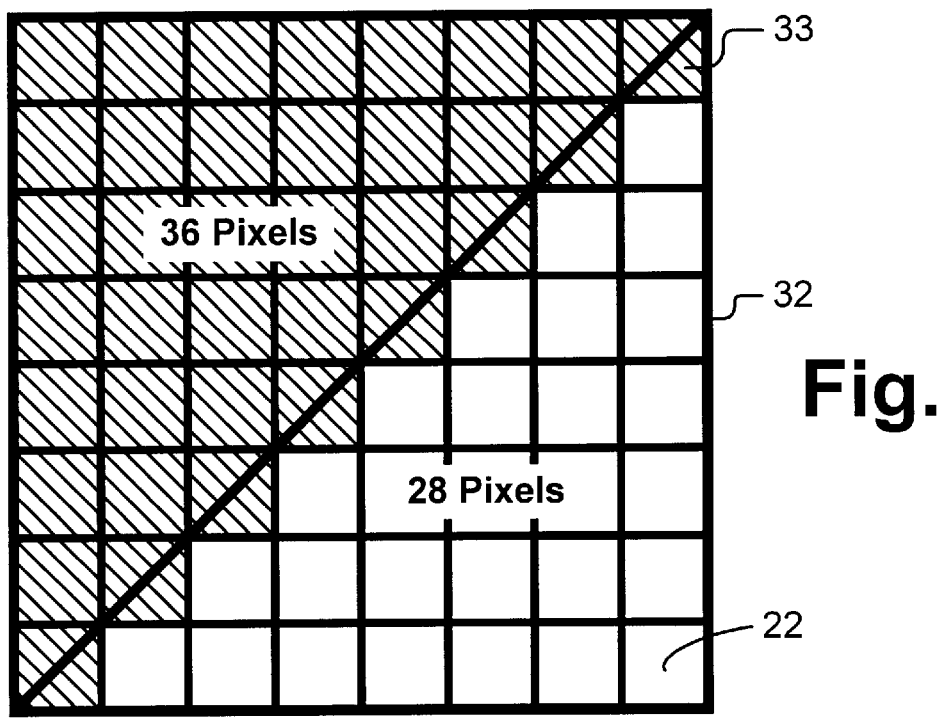
FIGS. 4a to 4c are illustrations of alternative decompositions of the screen into tiles and S-triangles.
Figure 4B:
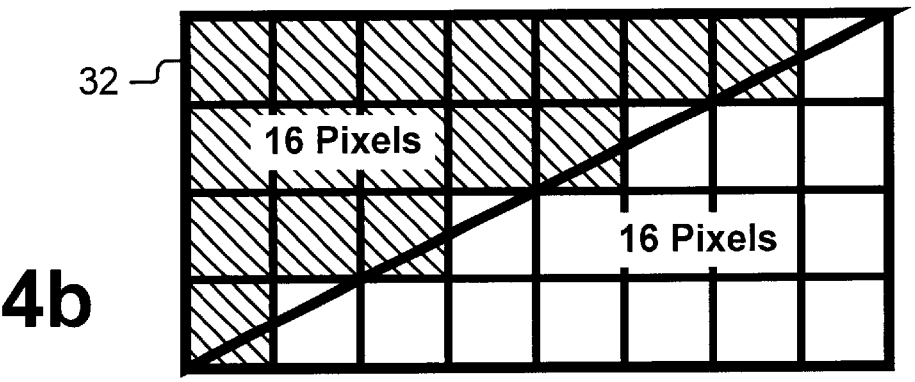
Figure 4C:
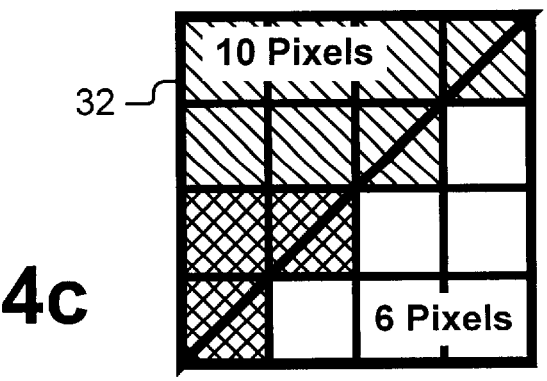

The preferred embodiment will now be discussed in greater detail. The virtual screen 21 is divided into tiles 32, as shown in FIG. 3. The tiles are further subdivided into triangles 33, herein called S-triangles. Examples for different tile sizes and S-triangles 33 are shown in FIGS. 4a, 4b, and 4c.

Figure 5:
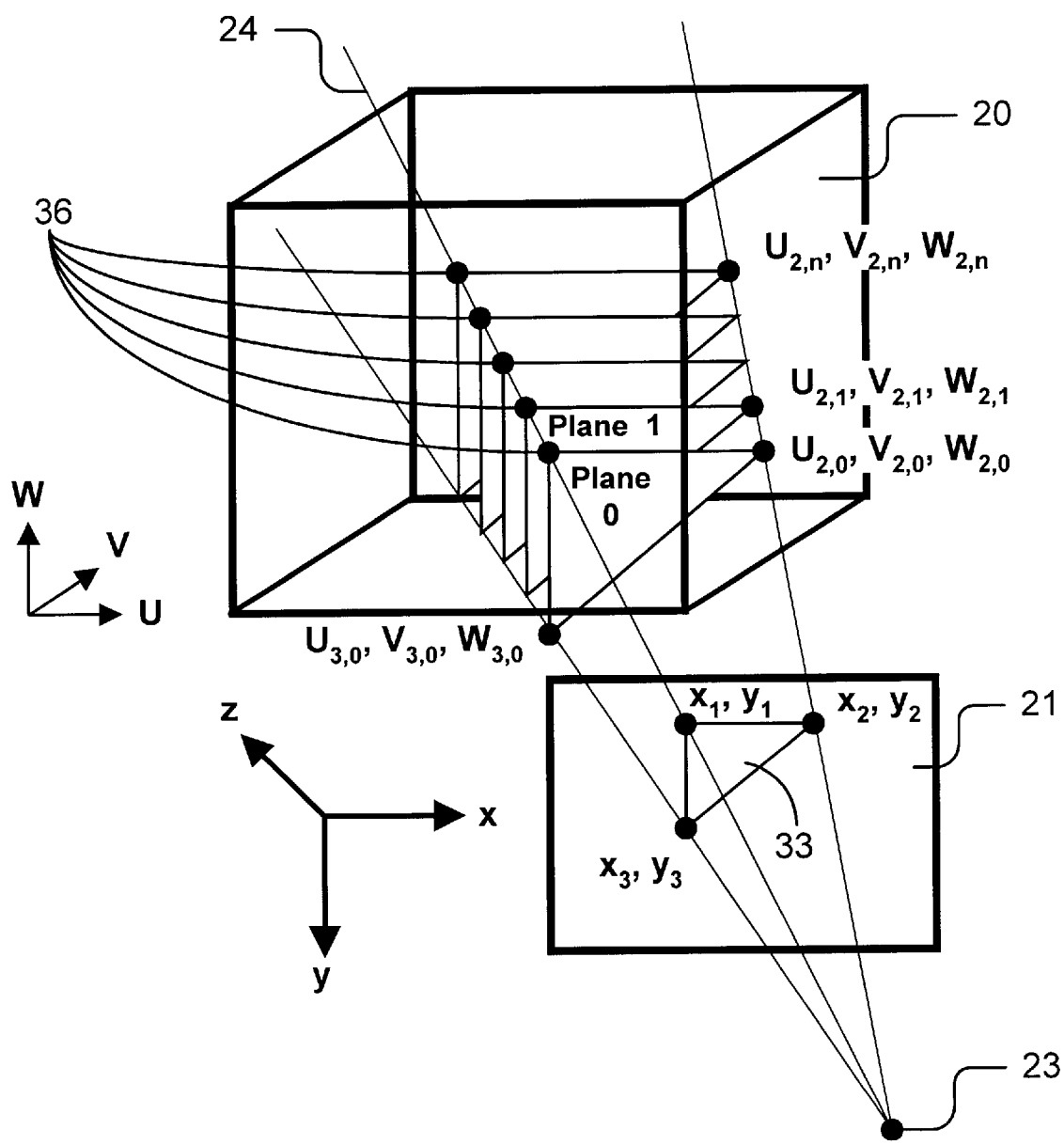
FIG. 5 is an illustration of the projection of S-triangles onto parallel planes to form P-triangles.

Reference is now made to FIG. 5. Conceptually a set of equidistant planes parallel to the screen 21 is constructed. The virtual screen is rendered in units of S-triangles. A given S-triangle is projected on all planes, giving a set of triangles called P-triangles 34. The vertices defined by the projection of a given S-triangle vertex on all planes are herein called corresponding vertices 36.

For a given S-triangle the closest P-triangle which cuts the volume data set or a bounding hull is determined. This triangle is herein called the front triangle 35. The coordinates of the vertices of that triangle 35 in the coordinate system of the volume data set 20 are computed. This initial computation is usually done on the host CPU 11. The axes of the screen coordinate system are denoted x,y,z, whereas the coordinates of the volume data set are denoted U, V, W.

The next step is to compute the derivatives of U, V and W with respect to the screen coordinates:

$$\frac{dU}{dx}, \frac{dU}{dy}, \frac{dV}{dx}, \frac{dV}{dy}, \frac{dW}{dx}, \frac{dW}{dy} \qquad (1)$$

This step is herein called the setup calculation. It is either performed on the host CPU 11 or on a dedicated arithmetic unit (e.g., a setup processor 13).

Given the associated U-, V- and W-coordinates at the first pixel of the S-triangle 33, the U-, V- and W-parameters of all other pixels are computed incrementally using the quantities in (1). Since the P-triangles 34 lie on planes parallel to the view plane, the parameters in (1) are constant for a given P-triangle.

With this set of x,y,U,V and W-parameters for the starting vertex and the derivatives, the frontmost P-triangle 35 is ready to be scan-converted and textured by the rasterization/texturing unit 14. The result is a set of interpolated raypoints, one for each of the rays 24 which are defined by the screen pixels of the associated S-triangle 33. A raypoint is represented by RGBα-values. Although the front triangle 35 by definition cuts the volume data set 20, one or more or even all raypoints may be outside the volume, which must be discarded then. The RGBα-values are stored in the on-chip triangle buffer and compositing unit 18.

Corresponding vertices 36 project to the same x- and y-coordinates, but have different U-, V- and W-coordinates. However, these coordinates can be found by adding a constant offset when proceeding from one plane to the next. This gives:

$$U_{k,n+1} = U_{k,n} + \Delta U_k$$
$$V_{k,n+1} = V_{k,n} + \Delta V_k$$
$$W_{k,n+1} = W_{k,n} + \Delta W_k \quad (2)$$

where k={1, 2, 3} denotes the P-triangle vertex 36 and n is the plane number. Thus, to generate the coordinates of the starting vertex of P-triangle n+1 in volume data set space from the starting vertex parameters of P-triangle n, three additions are performed. Again, it is assumed that the distance from any plane to its neighboring plane is constant.

Figure 6:
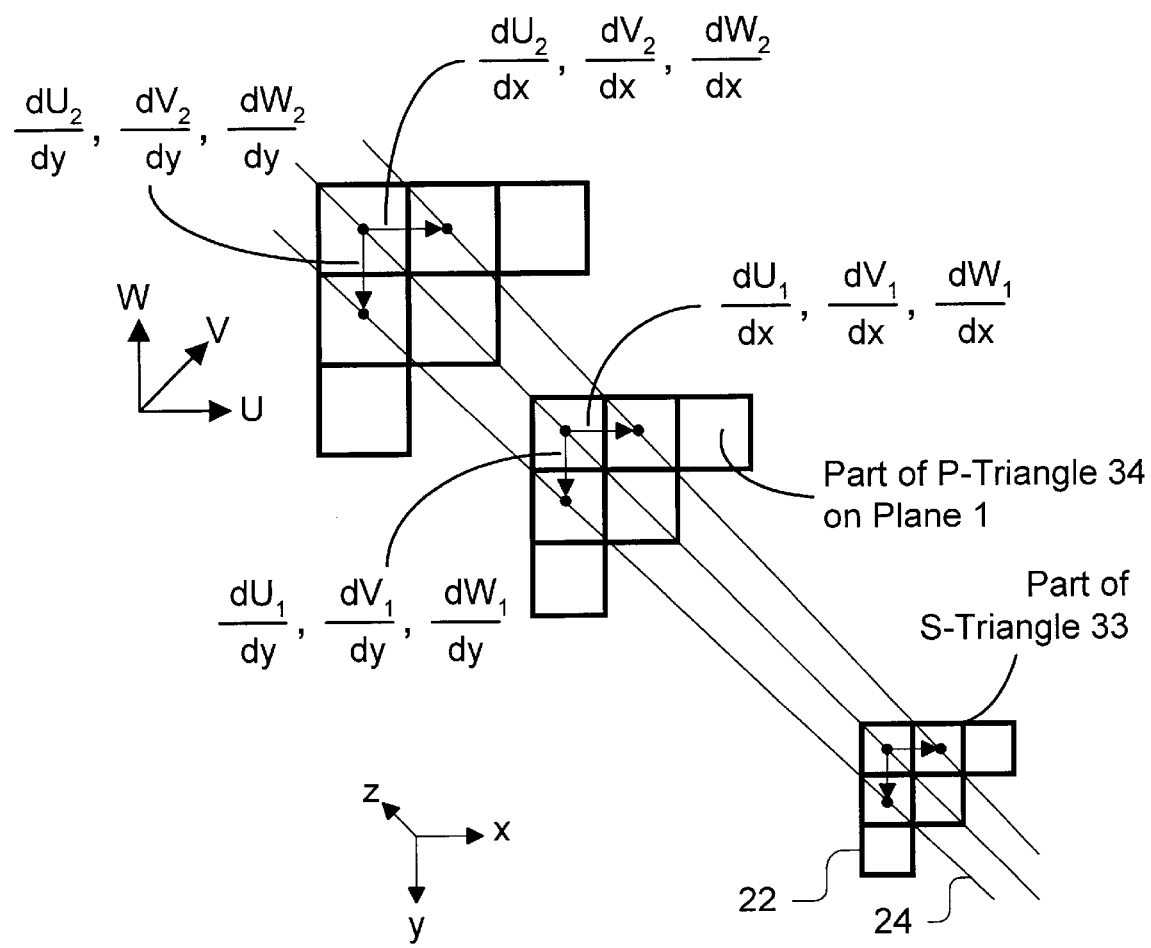
FIG. 6 is an illustration of how texture derivatives may be used to determine coordinates of raypoints.

For perspective projections, the derivatives in (1) are not constant from one plane to the next. Thus, these parameters are updated as well. However, these updates are again linear increments. A geometric illustration is shown in FIG. 6. Thus, updating the derivatives is given by:

$$\frac{dU_{n+1}}{dx} = \frac{dU_n}{dx} + \Delta\frac{dU}{dx}; \quad \frac{dU_{n+1}}{dy} = \frac{dU_n}{dy} + \Delta\frac{dU}{dy} \quad (3)$$
$$\frac{dV_{n+1}}{dx} = \frac{dV_n}{dx} + \Delta\frac{dV}{dx}; \quad \frac{dV_{n+1}}{dy} = \frac{dV_n}{dy} + \Delta\frac{dV}{dy}$$
$$\frac{dW_{n+1}}{dx} = \frac{dW_n}{dx} + \Delta\frac{dW}{dx}; \quad \frac{dW_{n+1}}{dy} = \frac{dW_n}{dy} + \Delta\frac{dW}{dy}$$

This update involves six additions. Thus, generating the parameters for P-triangle n+1 from the parameters of P-triangle n requires nine additions. This operation is performed by the triangle unit 17.

The operations in (2) and (3) should be completed before the rasterization/texturing unit 14 has finished processing the actual P-triangle 34. Assuming that the processing of one screen pixel 22 takes the same amount of time needed for an addition, the updates can be made sequentially if the S-triangles 33 have more than nine pixels. For the embodiment presented here, this operation is done partially sequentially using three adders.

Using this scheme, the host CPU 11 (possibly in cooperation with the geometry and setup processors 12 and 13) generates only the screen coordinates of the vertices of the actual S-triangle 33, the U-,V- and W- coordinates of the starting vertex of the front triangle 35, the derivatives in (1) and the increments in (2) and (3). Additionally, the last P-triangle having points in common with the data set (called the "back triangle") is determined, and a counter value is set up accordingly. The triangle unit 17 terminates the processing of a given S-triangle when this counter has expired or if early ray termination applies.

Reference is now made to FIG. 7, which shows one of the possible embodiments of the triangle unit 17, which performs the operations in (2) and (3). The triangle unit 17 includes three adders 43, 44, 45, three multiplexers 46, 47, 48, a control unit 53, a counter 52, three sets of increment register sets 40, 41, 42 and three sets of result register sets 49, 50, 51.

Operation is as follows. For a given S-triangle 33, all needed rasterization and texturing parameters of the front triangle 35 are generated by the host CPU 11 or dedicated hardware units (geometry processor 12, setup processor 13) and written into the result register sets 49, 50, 51. The increments of the texture coordinates and their derivatives are also computed and written into increment register sets 40, 41, 42. The control unit 53 selects the correct register set 40, 41, 42, 49, 50 or 51, facilitates the write operation and controls the multiplexers 46, 47, 48 according to control signals received from the generating device 11, 12, 13.

The last write operation for a given S-triangle refers to the loadable counter 52. The counter value is given by the number of P-triangles 34 from the front to the back triangle. Once this counter 52 is loaded, the control unit 53 transfers the parameters of the front triangle 35 to the rasterizer/texturing unit 14. Immediately thereafter, the parameters of the next P-triangle 34 are computed and stored in the result register sets 49, 50, 51. Furthermore, the counter value is decremented by one triggered by the control unit 53. If the counter value reaches zero, a control signal CS1 is asserted for the triangle buffer and compositing unit 18 and the host CPU 11, and the control unit 53 terminates processing until being programmed for the next front triangle 35 of the next S-triangle 33. Otherwise the control unit 53 waits until the rasterizer/texturing unit 14 is ready for the next P-triangle 34.

Termination of the current S-triangle can also occur if the triangle buffer and compositing unit 18 detects that all P-triangles 34 behind the one it has just finished compositing are invisible. In this case, the triangle buffer and compositing unit 18 activates control signal CS2.

Operational speed of the triangle unit 17 can be increased by using a larger number of adders, multiplexers and register sets.

The triangle unit 17 can be provided with extensions for Depth-Queuing. Depth queuing means that the light intensity reflected from the raypoints is attenuated with increasing distance to the observer.

If the rasterization/texturing unit 14 is capable of weighting the pixel color resulting from the texturing operation (in the following called $R_T G_T B_T$) by the pixel's interpolated color from the shading operation (here denoted $R_I G_I B_I$), i.e.

$$R = R_T \cdot R_I$$
$$G = G_T \cdot G_I$$
$$B = B_T \cdot B_I \quad (4)$$

then this feature can be used for depth-queuing in the following way. The triangle unit 17 assigns each P-triangle a constant grayvalue (i.e., R=G=B=constant across a given P-triangle), which decreases from one plane to the next. This is accomplished by computing $$R_{n+1} = R_n - \Delta R$$
$$G_{n+1} = G_n - \Delta G$$
$$B_{n+1} = B_n - \Delta B \quad (5)$$

where n is the plane number and where $$\Delta R = \Delta G = \Delta B \quad (6)$$

and where $$\frac{dR}{dx} = \frac{dR}{dy} = \frac{dG}{dx} = \frac{dG}{dy} = \frac{dB}{dx} = \frac{dB}{dy} = 0 \quad (7)$$

For that purpose, the host CPU 11 computes the grayvalue (at the starting vertex) of the front triangle 35 for a given S-triangle 33 and writes these quantities into the result register sets 49, 50 and 51, one color component per register set. Each of these register sets 49, 50 and 51 is extended by two more storage locations to hold the (zero-valued) derivatives in (7) of the associated color component. The host CPU 11 also computes the quantities $\Delta R$, $\Delta G$ and $\Delta B$, which are written into the extended increment register sets 40, 41 and 42.

For the generation of a P-triangle 34, the triangle unit 17 performs the operation in (5) in one additional step using the adders 43, 44 and 45. The results, the quantities in (7) and all other parameters as described above are then transferred to the rasterization/texturing unit 14. By using $$\Delta R \neq \Delta G \neq \Delta B \quad (8),$$

the effect of distance-dependent color shifts can be simulated.

Reference is now made to FIG. 8, which shows the triangle buffer and compositing unit 18. The triangle buffer and compositing unit 18, located on the rasterization/texturing unit 14, includes a storage unit 71 (herein called a triangle buffer) to hold the intermediate results for that number of rays defined by the number of pixels 22 of an S-triangle 33, and arithmetic units to perform the compositing operation, collectively called compositing unit 18a.

Compositing is done in front-to-back order (which defines the order of the P-triangles) to take advantage of early ray termination (on a per-triangle-basis).

Instead of storing an opacity-value $\alpha$, the triangle buffer 71 stores the transparency $\Omega$, which is defined as:

$$\Omega = 1 - \alpha \quad (9)$$

where $0 \leq \alpha \leq 1$. A transparency of $\Omega=1$ means complete transparency, whereas a raypoint with a transparency of $\Omega=0$ is totally opaque. The transparency $\Omega$ is used to reduce the number of arithmetic operations for the compositing operation.

For the processing of the $n^{th}$ resample location (a raypoint on the $n^{th}$ P-triangle), the following operations are performed:

$$R_{new} = R_{old} + R_n \alpha_n \Omega_{old}$$

$$G_{new} = G_{old} + G_n \alpha_n \Omega_{old}$$

$$B_{new} = B_{old} + B_n \alpha_n \Omega_{old}$$

$$\Omega_{new} = \Omega_{old}(1 - \alpha_n) = \Omega_{old} - \alpha_n \Omega_{old} \quad (10)$$

In (10), $R_n$, $G_n$ and $B_n$ are the interpolated color components of the resample location (raypoint). Accordingly, $\alpha_n$ is the interpolated opacity. The quantities with index "old" are taken out of the triangle buffer 71 and represent the properties of the ray it has accumulated up to the $n-1^{th}$ raypoint. The quantities with index "new" are computed by the compositing unit and written back into the triangle buffer 71. These quantities represent the color and translucency of the ray, including the nth raypoint.

The operation in (10) is a serious source of inefficiency in traditional systems, since it involves a read-modify-write operation on the external frame buffer for every raypoint. Therefore, a dual-ported SRAM (one read-port and one write-port), which is placed on the same chip 6 as the rasterization/texturing unit 14 and which serves as the frame buffer 15 for one complete S-triangle 33 (see FIG. 2), can totally eliminate this performance limitation.

The number of needed storage locations in the triangle buffer 71 is given by the number of pixels of the largest S-triangle. For screen tiles as shown in FIG. 4a, the number of storage locations is 36.

If all RGB$\Omega$-quantities have 16-bit precision, which has been found sufficient in most practical cases, one pixel would need 8 bytes in the triangle buffer 71. The thirty six entries would need only 288 bytes, which is easily feasible using existing technology. This small size allows a fast, dual-ported memory, one write-port and one read-port, to be used so that reading the $p^{th}$ pixel and writing the p-$k^{th}$ pixel can take place at the same time (as explained below). Assuming a cycle time of 10 ns for the triangle buffer 71, 100M raypoints per second can be reached in this part of the pipeline, at least a 10-fold improvement over comparable systems.

The arithmetic operations in (10) may be carried out using a pipeline. An example of an embodiment is shown in FIG. 8.

Operation is as follows. After having generated and processed a raypoint, the rasterization/texturing unit 14 writes its parameters into the input register 70. The x- and y-coordinates are used to address the triangle buffer 71 for a read access. The triangle buffer delivers the intermediate parameters of the viewing ray passing through the pixel at coordinates x,y on the virtual screen. All parameters are written into a pipeline register 72.

In the next stage, the term $\alpha_n \Omega_{old}$ is computed using multiplier 73. The result together with all other needed parameters are stored in pipeline register 74.

The next stage computes the quantities $R_n \alpha_n \Omega_{old}$, $G_n \alpha_n \Omega_{old}$, $B_n \alpha_n \Omega_{old}$ and $\Omega_{new} = \Omega_{old} - \alpha_n \Omega_{old}$ using the subtractor 75 and the multipliers 76, 77 and 78. The results together with all other needed parameters are stored in pipeline register 79.

The last stage computes $R_{new}$, $G_{new}$ and $B_{new}$ using adders 80, 81 and 82. The left hand parameters in (10) and the screen coordinates are stored in pipeline register 83.

The last step in the compositing operation is to write the results back into the triangle buffer 71 via the write port.

The index n denoting the actual P-triangle is not shown in FIG. 8 because it is assumed that all raypoints are on the same P-triangle. The parameter p in FIG. 8, however, is the pixel number of the actual P-triangle, as depicted in FIG. 9. Due to the pipelined architecture, there are a number of pixels of a given P-triangle under construction simultaneously. Using a dual-ported memory, reading the stored values for pixel p is done concurrently to writing the new intermediate results for pixel p-4.

Actual implementation and number of pipeline stages may be different from the embodiment illustrated in FIG. 8. For correct operation, however, it may never happen that pixel p of triangle n+1 is read while or before pixel p of triangle n is completed. Given a certain number of pipeline stages, this sets a lower limit for the number of pixels of the S-triangles.

Early ray termination is facilitated by using the threshold register 84, comparator 85, counter 86, comparator 87 and register 88. The user can specify a threshold value $\epsilon$, which is stored in the threshold register 84, for the transparency $\Omega$ along the rays. If the transparency $\Omega$ falls below the threshold $\epsilon$ for a given ray, all further raypoints are considered invisible. The processing of a given S-triangle can be terminated if this condition occurs for all pixels in the current P-triangle.

Every newly generated transparency value $\Omega$ is compared to this threshold $\epsilon$ using comparator 85. If it is less, the counter 86 is incremented by activating the CNT-input. This counter 86 is reset at the beginning of the processing of any P-triangle. If the counter 86 reaches the number of pixels of the S-triangle, which is stored in register 88, then every ray of that S-triangle has traversed so much (partially) opaque material that no further raypoints are visible. This condition is detected using comparator 87. In this case, the compositing unit 18a sends signal CS2 to the triangle unit 17 to terminate the processing of the S-triangle.

Whenever the processing of an S-triangle is finished, the RGB-contents of all triangle buffer entries are transferred to the external frame buffer 15 for display. For the next S-triangle, the RGB-entries are set to zero, whereas the $\Omega$-fields are initialized to one.

The compositing unit 18a may be implemented as an extension to an existing blending stage, which may be part of the rasterization/texturing unit 14, for blending RGB$\alpha$-textures, transparent objects or multi-textured objects.

The CPU 11 may execute an algorithm for generating the front and back triangles and skipping empty space. The main task is to determine the front and the back triangle of a given S-triangle such that work in empty space is minimized as much as the algorithm and the processing overhead permit. The presented algorithm is only an approximation to the true solution. Refinements are possible, but will increase the computational requirements.

Figure 10A:
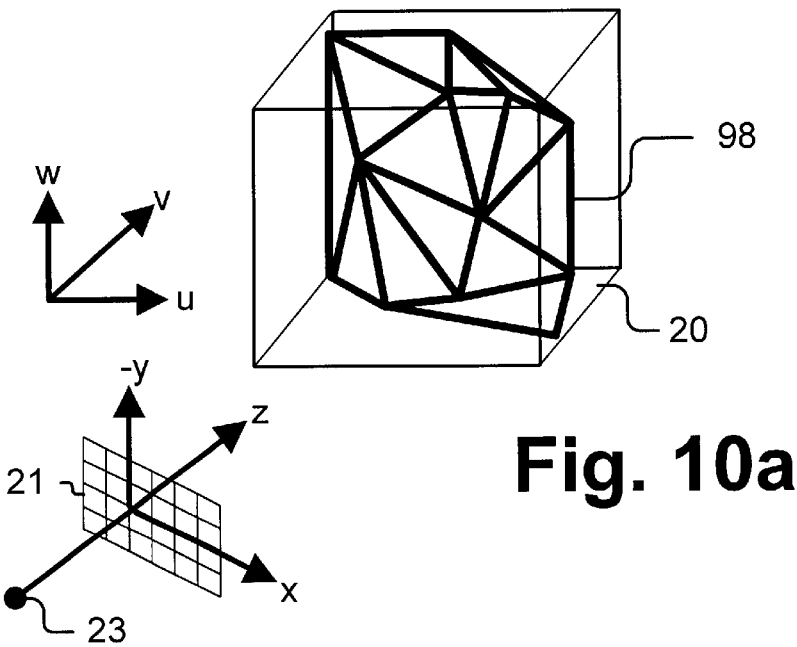
FIGS. 10a and 10b are illustrations of a bounding hull for a volume data set.

The task of determining the front and the back triangle is accomplished by using a separate data structure, maintained by the host CPU 11 in main memory 10. This data structure is a bounding hull 98 of the non-empty elements in the volume data set 20 as shown in FIG. 10a. If the data set 20 contains different materials, each material should have its own hull.

In principle, the bounding hull 98 can be defined in an arbitrary way. To be practical, it is assumed that the bounding hull 98 is approximated by a triangle-mesh. The triangles of the hull 98 are herein denoted H-triangles 99.The bounding hull 98 should be approximated using only a small number of H-triangles 99, typically less than 200. The bounding hull 98 is built once per data set, or once per re-classification. Algorithms for building this hull 98 are known (e.g., the Marching-Cube-algorithm, mesh simplification methods). For some data sets, however, the hull 98 may simply be the bounding box of the entire data set, as shown in FIG. 12a. This is the case whenever the entire volume is filled with meaningful data, or when the structures inside the data set 20 are too complicated to be enclosed in a hull of a few triangles.

Figure 10B:
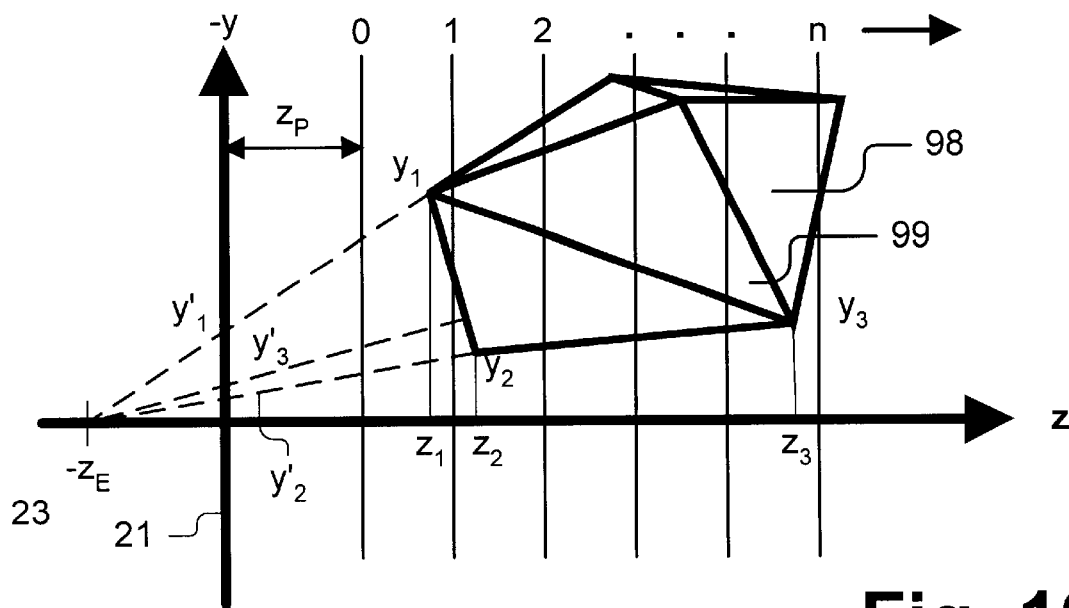

Given the triangular hull 98 of a data set 20, the H-triangles 99 are first geometrically transformed into screen space, as shown in FIG. 10b, where reference numeral 23 represents an eye point.

For each transformed H-triangle 99, the vertices with the smallest and the largest z-value are determined. Each H-triangle 99 is then assigned two numbers: the number nf of the next plane in front of it and the number nb of the plane directly behind it. Plane 0 is the closest plane to the eye point 23.

The H-triangles are then perspectively projected on the virtual screen 21 as shown FIG. 10b. Additionally, clipping operations are performed for hull triangles whose projections are partly outside the virtual screen 21.

To determine the front and back triangles for all S-triangles, the projected H-triangles 99 are scan-converted in units of screen tiles. The scan conversion algorithm works in such a way that it marks a tile covered by an H-triangle 99 as soon as the H-triangle 99 covers any small part of it. This is shown in FIG. 11.

A front-buffer and a back-buffer are maintained at tile resolution in main memory 10, i.e., every tile is assigned one storage location in both buffers. Prior to rendering a screen 21, the front-buffer is initialized with the largest possible value, whereas the back-buffer is initialized with the smallest possible value. Whenever an H-triangle 99 covers part of a tile, its front plane number nf is compared to the tile's entry in the front-buffer. If the front plane number nf is smaller, it replaces the previous value. Otherwise, no update occurs.

The back plane number nb is compared to the entry in the back-buffer, and written into it if it is greater than the previous value. When all H-triangles 99 have been processed, the plane of the first P-triangle and the plane of the last P-triangle are known for each tile or its two S-triangles.

Tiles which still have their initial value in the front-buffer don't need to be processed, since the projections of its two S-triangles would not cut the bounding hull 98.

The number of P-triangles 34 for a given S-triangle 33 is given by the number nb−nf+1. This number is written into the counter 52 of the triangle unit 17.

The present invention is not limited to the embodiments described above. Instead, the present invention is construed according to the claims that follow.

What is claimed is:

1. A method of generating an image from a volume data set, the method comprising:

dividing the image into a plurality of sub-regions, each sub-region including a plurality of pixels;

processing each sub-region one at a time, each sub-region being processed by creating a projection of the sub-region on at least one plane cutting the volume data set, texture mapping at least one projection of the sub-region using the volume data set as texture, starting at a first plane and working towards a last plane, and compositing each textured projection after texture mapping; and displaying the composited projections;

wherein a front projection is created by computing volume data set coordinates of at least one raypoint on a projection on the closest plane cutting the volume data set; computing derivatives of the coordinates with respect to image coordinates, and computing increments for the coordinates and the derivatives.

2. The method of claim 1, wherein at least one projection following the front projection of a given sub-region is created by updating texture coordinates and texture coordinate derivatives of a previous projection, the texture coordinates and texture coordinate derivatives being updated by adding increments to the texture coordinates and texture coordinate derivatives of the previous projection.

3. The method of claim 1, further comprising the step of performing depth queuing on at least one projection following the front projection.

4. The method of claim 1, wherein processing of a sub-region is terminated at a given projection if visibility of all subsequent projections on planes behind the given projection falls below a threshold, whereby early ray termination is performed.

5. The method of claim 1, further comprising generating a bounding hull around non-empty space of the volume data set and processing only those projections that are at least partially within the bounding hull.

6. The method of claim 1, wherein a CPU is used to generate the sub-regions.

7. The method of claim 1, wherein each projection is textured by using a rasterization/3D texturing unit and the volume data set as 2D texture.

8. The method of claim 1, wherein a chip is used to create, texture and composite the projections, and wherein displaying the composited projections includes writing the composited projections to off-chip memory.

9. A method of generating an image from a volume data set, the method comprising:
   dividing the image into a plurality of triangles, each triangle including a plurality of pixels;
   processing each triangle one at a time, each triangle being processed by creating a projection of the triangle on at least one plane cutting the volume data set, texture mapping at least one projection of the triangle using the volume data set as texture, starting at a first plane and working toward a last plane, and compositing each textured projection after texture mapping; and
   displaying the composited projections;
   wherein a front projection is created by computing volume data set coordinates of at least one raypoint on a projection on the closest plane cutting the volume data set, computing derivatives of the coordinates with respect to image coordinates, and computing increments for the coordinates and the derivatives; and
   wherein at least one projection following the front projection of a given triangle is created by updating texture coordinates and texture coordinate derivatives of a previous projection, the texture coordinates and texture coordinate derivatives being updated by adding increments to the texture coordinates and texture coordinate derivatives of the previous projection.

10. Apparatus for processing an image from a volume data set, the apparatus comprising:
    a processor for dividing the image into a plurality of sub-regions, each sub-region including a plurality of pixels;
    an external frame buffer; and
    a chip for processing the sub-regions one at a time, the chip including a first unit for creating a projection of a given sub-region on at least one plane cutting the volume data set; a rasterization/3D texturing unit for texturing each projection received from the first unit; and a second unit for buffering and compositing each projection textured by the texturing unit;
    the chip writing the composited projections to the external frame buffer;
    wherein the second unit examines composite transparency of the projections, and wherein the second unit causes processing of a sub-region to be terminated if the transparency falls below a visibility threshold.

11. The apparatus of claim 10, wherein the processor computes a front projection for each sub-region by computing volume data set coordinates of at least one raypoint on a projection on the closest plane cutting the volume data set, and wherein the processor further computes derivatives of the coordinates with respect to image coordinates, and increments for the coordinates and the derivatives.

12. The apparatus of claim 11, wherein the first unit is loaded with a front projection of a $j^{th}$ sub-region, wherein the first unit processes the front projection and uses the increments and the coordinates of the front projection to generate subsequent projections for the $j^{th}$ sub-region, the coordinates and derivatives being updated for each subsequent projection by adding the increments to the coordinates and derivatives, and wherein the first unit is loaded with the front projection of the next $j+1^{th}$ sub-region after the processing of the $j^{th}$ sub-region has been completed.

13. The apparatus of claim 10, wherein the second unit includes an on-chip buffer for holding the intermediate results for a number of rays defined by the number of pixels of a sub-region; and a plurality of arithmetic units for compositing the projections into the on-chip buffer.

14. The apparatus of claim 13, wherein the on-chip buffer includes dual ported memory.

15. The apparatus of claim 13, wherein the on-chip buffer includes a number of storage units corresponding to the number of pixels in a sub-region.

16. The apparatus of claim 13, wherein the arithmetic units have a pipelined architecture.

17. Apparatus for processing an image from a volume data set, the apparatus comprising:
    a processor for dividing the image into a plurality of sub-regions, each sub-region including a plurality of pixels, the processor also generating a bounding hull for the volume data set;
    an external frame buffer; and
    a chip for processing the sub-regions one at a time, the chip including a first unit for creating a projection of a given sub-region on at least one plane cutting the volume data set; a rasterization/3D texturing unit for texturing each projection received from the first unit; and a second unit for buffering and compositing each projection textured by the texturing unit;
    the chip writing the composited projections to the external frame buffer;
    the first unit only generating projections that are at least partially within the bounding hull.

18. A graphics accelerator for processing a plurality of sub-regions of an image from a volume data set, the graphics accelerator comprising:
    an external frame buffer; and
    a chip for processing the sub-regions one at a time, the chip including a first unit for creating a projection of a given sub-region on at least one plane cutting the volume data set; a rasterization/3D texturing unit for texturing each projection received from the first unit; and a second unit for buffering and compositing each projection textured by the rasterization/3D texturing unit;
    the chip writing the composited projections to the external frame buffer;
    wherein the chip computes a front projection for each sub-region by computing volume data set coordinates of at least one raypoint on a projection on the closest plane cutting the volume data set, and wherein the chip further computes derivatives of the coordinates with respect to image coordinates, and increments for the coordinates and the derivatives.

19. A volume rendering chip for processing a sub-region of an image from a volume data set, the chip comprising:
    a first unit for creating a projection of the sub-region on at least one plane cutting the volume data set;
    a rasterization/ 3D texturing unit for texturing each projection received from the triangle unit; and
    a second unit for buffering and compositing each projection textured by the rasterization/3D texturing unit;

a composited projection being provided on an output of the chip after the last textured projection has been composited;

the second unit examining composite transparency of the projections, and causing the processing of a sub-region to be terminated if the transparency falls below a visibility threshold.

20. The chip of claim 19, wherein the first unit is loaded with coordinates of a front projection of a $j^{th}$ sub-region, derivatives of the coordinates with respect to image coordinates, and increments for the coordinates and the derivatives; wherein the first unit processes the front projection and uses the increments and the coordinates of the front projection to generate subsequent projections for the $j^{th}$ sub-region, the coordinates and derivatives being updated for each subsequent projection by adding the increments to the coordinates and derivatives, and wherein the first unit is loaded with the front projection of the next $j+1^{th}$ sub-region after the processing of the $j^{th}$ sub-region has been completed.

21. The chip of claim 19, wherein the second unit includes an on-chip buffer for holding the intermediate results for a number of rays defined by the number of pixels of a sub-region; and a plurality of arithmetic units for compositing the projections into the on-chip buffer.

22. The chip of claim 21, wherein the on-chip buffer includes dual ported memory.

23. The chip of claim 21, wherein the on-chip buffer includes a number of storage units corresponding to the number of pixels in a sub-region.

24. The chip of claim 21, wherein the arithmetic units have a pipelined architecture.

25. A volume rendering system comprising:
means for providing an image from a volume data set;
means for dividing the image into a plurality of sub-regions, each sub-region including a plurality of pixels;
means for processing each sub-region one at a time by creating a projection of each sub-region on at least one plane cutting the volume data set, texture mapping at least one projection of the sub-region using the volume data set as texture, and compositing each textured projection after texture mapping, a front projection being created by computing volume data set coordinates of at least one raypoint on a projection on the closest plane cutting the volume data set; computing derivatives of the coordinates with respect to image coordinates, and computing increments for the coordinates and the derivatives; and
means for displaying the composited projections.

26. A volume rendering system comprising:
means for providing an image from a volume data set;
means for dividing the image into a plurality of sub-regions, each sub-region including a plurality of pixels;
means for processing each sub-region one at a time by creating a projection of each sub-region on at least one plane cutting the volume data set, texture mapping at least one projection of the sub-region using the volume data set as texture, and compositing each textured projection after texture mapping;
means for displaying the composited projections; and
means for performing depth queuing on at least one projection following the front projection.

27. A volume rendering system comprising:
means for providing an image from a volume data set;
means for dividing the image into a plurality of sub-regions, each sub-region including a plurality of pixels;
means for processing each sub-region one at a time by creating a projection of each sub-region on at least one plane cutting the volume data set, texture mapping at least one projection of the sub-region using the volume data set as texture, and compositing each textured projection after texture mapping, the processing of a sub-region being terminated at a given projection if visibility of all subsequent projections on planes behind the given projection falls below a threshold; and
means for displaying the composited projections.

28. A volume rendering system comprising:
means for providing an image from a volume data set;
means for dividing the image into a plurality of sub-regions, each sub-region including a plurality of pixels;
means for generating a bounding hull around non-empty space of the volume data set;
means for processing each sub-region one at a time by creating a projection of each sub-region on at least one plane cutting the volume data set, texture mapping at least one projection of the sub-region using the volume data set as texture, and compositing each textured projection after texture mapping, only those projections that are at least partially within the bounding hull being processed; and
means for displaying the composited projections.

* * * * *